United States Patent
Goc-Maciejewska et al.

(10) Patent No.: US 8,058,377 B1
(45) Date of Patent: Nov. 15, 2011

(54) PHOSPHATE-CONTAINING POLYCARBOXYLATE POLYMER DISPERSANTS

(75) Inventors: Izabela Goc-Maciejewska, Skórzewo (PL); Byong-wa Chun, Rancho Palos Verdes, CA (US); Piotr Krzyzanowski, Poznan (PL)

(73) Assignee: W. R. Grace & Co.-Conn., Columbia, MD (US)

( * ) Notice: Subject to any disclaimer, the term of this patent is extended or adjusted under 35 U.S.C. 154(b) by 0 days.

(21) Appl. No.: 12/822,284

(22) Filed: Jun. 24, 2010

(51) Int. Cl.
*C08F 30/02* (2006.01)
*C08F 20/06* (2006.01)
(52) U.S. Cl. .................. 526/277; 526/317.1; 526/310
(58) Field of Classification Search .................. 526/277, 526/317.1, 318; 524/5
See application file for complete search history.

(56) References Cited

U.S. PATENT DOCUMENTS

| | | | |
|---|---|---|---|
| 4,471,100 A | 9/1984 | Tsubakimoto et al. | |
| 4,906,298 A | 3/1990 | Natsuume et al. | |
| 4,946,904 A | 8/1990 | Akimoto et al. | |
| 5,100,984 A | 3/1992 | Burge et al. | |
| 5,369,198 A | 11/1994 | Albrecht et al. | |
| 5,393,343 A | 2/1995 | Darwin et al. | |
| 6,352,952 B1 | 3/2002 | Jardine et al. | |
| 6,462,110 B2 * | 10/2002 | Satoh et al. | 524/5 |
| 7,470,733 B2 | 12/2008 | Shirota et al. | |
| 2006/0293417 A1 | 12/2006 | Taniguchi et al. | |
| 2008/0035022 A1 | 2/2008 | Hamada et al. | |
| 2009/0258969 A1 * | 10/2009 | Shimoda et al. | 524/3 |

FOREIGN PATENT DOCUMENTS

| | | |
|---|---|---|
| JP | 11079811 A | 3/1999 |
| JP | 2000327386 A | 11/2000 |

* cited by examiner

*Primary Examiner* — Ling-Siu Choi
(74) *Attorney, Agent, or Firm* — Craig K. Leon; Stephan P. Williams (57) ABSTRACT

Phosphate-containing polycarboxylate polymer dispersant compositions of the invention comprise a polymer made from polyoxyalkylene groups, acrylic acid groups, mono-ester groups, and optionally di-ester and tri-ester groups, all in specific molar ratios. The polymer dispersants of the invention achieve quick mix-in dispersibility, particularly within hydratable cementitious compositions such as concrete, in comparison with polycarboxylate polymer dispersants that do not contain phosphate groups, while having improved initial slump as well as slump retention compared to phosphate-containing polymers of the prior art.

11 Claims, 1 Drawing Sheet

PHOSPHATE-CONTAINING POLYCARBOXYLATE POLYMER DISPERSANTS

FIELD OF THE INVENTION

The present invention relates to materials for dispersing hydraulic cement, and more particularly to polycarboxylate polymers having acrylate- and phosphate-containing groups and to the use of such polymers in cementitious compositions and methods for making cementitious compositions.

BACKGROUND OF THE INVENTION

It is known to incorporate phosphate groups into polycarboxylate polymers used as water-reducing agents for concrete and other hydratable cementitious compositions.

In JP-A 11-79811, Hamada et al. disclosed a copolymer obtained by polymerizing a monomer having a sulfonic or phosphoric acid group, a monomer having an oxyalkylene group, and a monomer having a carboxylic acid group. It was described that the copolymer acted to reduce the water while otherwise maintaining the fluidity of concrete.

In JP-A 2000-327386 A1, Shoichi et al. disclosed a cement-dispersing polymer obtained by polymerizing a monoester or mono-ether, a polyalkylene glycol, and a monomer having a phosphoric acid group.

In U.S. Pat. No. 7,470,733, Shirota et al. disclosed the use of a phosphoric monoester having an alkyl ether group and a phosphoric di-ester having both alkyl ether and mono-ester groups, wherein the polymer had a monoester/monoester+diester ratio of 0.4 to 0.95. This characteristic purportedly imparted an excellent viscosity-reducing effect in the concrete.

In US Patent Application Publ. No. 2006/0293417 A1, Taniguchi et al. disclosed a two-polymer dispersant having improved viscosity-reducing effect. Polymer A contained carboxylic acid groups and oxyalkylene and/or oxystyrene groups, possibly including copolymers of a specified "monomer 1," namely, an ethylene unsaturated carboxylic acid derivative having a polyoxyalkylene group, and a (meth) acrylic acid group ("monomer 2"). Polymer B also contained "monomer 1" but further included a monophosphate group ("monomer 3") and diphosphate group ("monomer 4").

In US Patent Application Publication No. 2008/0035022 A1, Hamada et al. disclosed a phosphate polymer for improving fluidity and reducing viscosity of concrete. The polymer was obtained by copolymerizing a monomer having a polyoxyalkylene group ("monomer 1"), a phosphoric monoester ("monomer 2"), and a phosphoric diester ("monomer 3") at pH 7 or less. It was noted however that the phosphate monomers were obtained as a mixture of monoester and diester groups and were difficult to employ in cements. Hamada et al. copolymerized the monomers in a manner to suppress crosslinking and explained that the molar ratio of monomer 1 to monomers 2 and 3 was preferably 5/95 to 95/5 and more preferably 10/90 to 90/10 (See "[0099]"). The molar ratio among monomers 1, 2, and 3 was preferably 5-95/3-90/1-80, and, more preferably, 5-96/3-80/1-60 (total=100). The molar ratio and mol percentage of monomers 2 and 3 were calculated on the basis of the compound in the acid form (See "[0099]"). The molar ratio of monomer 2 (phosphate monoester) to monomer 3 (phosphate diester) could be 99/1 to 4/96, and more particularly 99/1 to 5/95 (See "[0101]").

In US Patent Application Publication No. 2009/0258969 A1, Shimoda et al. disclosed a method for producing a phosphoric acid, ester-based polymer, which included copolymerizing the following monomers: (1) an ethylene unsaturated carboxylic acid derivative having a polyoxyalkylene group; (2) a monoester phosphate-based monomer; and (3) a di-ester phosphate-based monomer. The polymer could be obtained by copolymerizing monomers 1, 2, and 3 at pH 7 or lower in the presence of a phosphonic acid-based chelating agent. Alternatively, the polymer could be obtained by mixing a solution containing monomers 1, 2, and 3 at a temperature of 10 to 50 degrees C., initiating a polymerization within 72 hours after mixing, and by maintaining this temperature until polymerization is initiated.

SUMMARY OF THE INVENTION

The present invention relates to dispersants for inorganic particles within aqueous environments, such as cement particles within wet slurries. The invention provides a phosphate-containing polycarboxylate polymer dispersant having improved mix dispersibility in comparison to polycarboxylate polymer dispersants that do not contain phosphate groups while also having improved initial slump and improved slump retention properties in comparison to prior art phosphate-containing polymers described in the above background.

The mix dispersibility of the polymers of the invention will be particularly useful in ready-mix delivery trucks or in plant batching operations, wherein time can be saved by the ability of the polymer dispersant to become uniformly distributed throughout a concrete mix in less time compared to polycarboxlate polymers that do not contain phosphate groups.

This relatively quicker mix dispersibility will be highly useful in automated mixing systems wherein the slump of concrete is monitored within a rotating drum mixer and adjusted by dosing a rheology-modifying agent (e.g., chemical admixture such as a water reducer or superplasticizer) into the mix. After dosing of the agent, the concrete is mixed, and energy required to turn the mixer is monitored until the energy curve flattens over time, thereby indicating that the dose has been uniformly dispersed within the mix. The dispersants of the invention disperse relatively more quickly than polycarboxylate polymers not containing phosphate groups, shortening the time needed in automated slump monitoring operations.

As another example, the dispersant polymers of the invention can be useful in precast operations, wherein batching for the progressive filling of molds is expedited by faster mix dispersibility.

An exemplary phosphate-containing polycarboxylate polymer dispersant of the invention for dispersing inorganic particles within an aqueous environment, such as concrete or other hydratable cementitious composition, comprises:

a polymer made from the following monomer components
(a) polyoxyalkylene monomer represented by structural formula (a)

wherein each of $R^1$ and $R^2$ individually represent a hydrogen atom or methyl group; $R^3$ represents hydrogen or —$(CH_2)_m$ $(CO)_nO(AO)_pX^1$ group; AO represents an oxyalkylene group having 2 to 4 carbon atoms (preferably 2 carbon atoms); "m" represents an integer of 0 to 2; "n" represents an integer of 0 or 1; "p" represents an average number of the total oxyalky- lene groups added and is an integer of from 5 to 200 (preferably from 5 to 100); and $X^1$ represents a hydrogen atom or alkyl group, respectively;

(b) acrylic acid monomer represented by structural formula (b)

wherein each of $R^4$, $R^{5'}$ and $R^6$ individually represent a hydrogen atom, a methyl group or —$(CH_2)_qC(O)OM^1$, respectively; "q" represents an integer from 0 to 2; $M^1$ represents a hydrogen atom, an alkali metal, or an alkali earth metal, respectively;

(c) phosphate monoester monomer represented by structural formula (c)

wherein $R^7$ represents a hydrogen atom or a methyl group; $R^8$ represents an alkylene group having 2 to 4 carbon atoms (preferably 2 carbon atoms); "r" is an integer of from 1 to 30 (preferably from 1 to 5); $M^2$ represents a hydrogen atom, an alkali metal or an alkali earth metal, respectively; and (d) phosphate diester monomer represented by structural formula (d)

wherein each of $R^9$ and $R^{11}$ individually represent a hydrogen atom or methyl group; each of $R^{10}$ and $R^{12}$ individually represent an alkylene group having 2 to 4 carbon atoms; each of "s" and "t" individually represent an integer of from 1 to 30 (preferably from 1 to 5); $M^3$ represents a hydrogen atom, an alkali metal or an alkali earth metal, respectively; and (e) phosphate triester monomer represented by structural formula (e)

wherein each of $R^{13}$, $R^{15}$, and $R^{17}$ individually represent a hydrogen atom or methyl group; $R^{14}$, $R^{16}$ and $R^{18}$ each individually represent an alkylene group having 2 to 4 carbon atoms (preferably 2 carbon atoms); each of "w", "x" and "y" individually represent an integer of from 1 to 30 (preferably from 1 to 5), respectively; and wherein the foregoing monomers (a), (b), (c), (d), and (e) are present in the following molar ratios, whereby the numerator and denominator numbers in a given range add up to 100, as follows:

(i) the molar ratio of monomers (a)+(b) to monomers (c)+(d)+(e) is in the range of 94-98/2-6;

(ii) the molar ratio of monomer (a) to monomer (b) is in the range of 20-60/40-80;

(iii) the molar ratio of monomer (c) to monomers (d)+(e) is in the range of 50-100/0-50; and (iv) the molar ratio of monomers (d) and (e) to all monomers (a) through (e) is in the range of 0-2/98-100.

By controlling the relative amounts of the monomers, the present invention provides phosphate-containing polycarboxylate polymer dispersants that achieve quick mix dispersibility while also having excellent initial slump behavior and slump retention with better dosage efficiency compared to phosphate-containing polymers described above in the background section.

Exemplary polymers of the invention may be used by themselves as additives or admixtures for addition to or into cementitious compositions, or in combination with one or more optional admixtures selected from air detainers, air entrainers, set accelerators, set retarders, viscosity modifying agents, or mixtures thereof. The invention also relates to cementitious compositions comprising a hydratable cementitious binder in combination with the above-described phosphate-containing polycarboxylate polymer dispersant, and optional admixture(s). The invention also relates to methods for modifying cementitious compositions comprising the use of the above-described phosphate-containing, polycarboxylate polymer and optional admixture(s).

The invention may be used also for dispersing various kinds of inorganic particles (e.g., including ink, slag, fly ash, pigments, or other inorganic particles).

Further advantages and features of the invention are described in further detailed hereinafter.

BRIEF DESCRIPTION OF THE DRAWINGS

Further advantages and features of the present invention may be more readily comprehended when the following detailed description of preferred embodiments is taken in conjunction with the appended drawings wherein.

DETAILED DESCRIPTION OF EXEMPLARY EMBODIMENTS

The present invention relates to phosphate-containing polycarboxylate polymers for dispersing inorganic particles, such as cement, ink, slag, fly ash, or the like, within an aqueous environment. Such inorganic particles include hydratable (or hydraulic) materials, such as hydratable cementitious particles that are suspended within the aqueous environment of a concrete slurry or mortar paste, wherein water is added to hydrate the cement binder and to initiate setting of the composition into a hardened structure.

Polymers containing carboxylic acid and/or salt groups shall be referred to as "polycarboxylate" polymers. Exemplary polycarboxylate polymers of the present invention further contain acrylic acid or salt groups, oxyalkylene groups, and phosphoric acid or salt ester groups. It will be understood that references to acid forms of such materials will include and refer to the salt form as well, and vice versa. Because acid and salt forms can simultaneously exist in aqueous environments, references to the term "polycarboxylic acid" will be understood to include polycarboxylates; references to the term "acrylic acids" will be understood to include acrylates; and references to the term "phosphoric acid" will be understood to include phosphates; and vice versa, as may be the case. Such acid and salt groups will be described as part of monomers used in making polymers of the present invention.

The term "cementitious" as used herein refers to a material that comprises portland cement and/or portland cement substitutes that when mixed with water function as a binder to hold together fine aggregates (e.g., sand), coarse aggregates (e.g., crushed stone or gravel), or mixtures thereof. Cementitious materials considered to be "hydratable" or hydraulic are those which harden by chemical interaction with water.

Such cementitious materials may further include fly ash, granulated blast furnace slag, lime stone, natural pozzolans, or mixtures thereof, which may be combined with portland cement or be used to replace or substitute for a portion of the portland cement without seriously diminishing hydratable properties. A "mortar" refers to cement or cementitious mixture having a fine aggregate such as sand; while a "concrete" refers more accurately to a mortar that also contains a coarse aggregate such as crushed stone or gravel.

As previously summarized above, an exemplary phosphate-containing polycarboxylate polymer dispersant of the invention comprises a polyoxyalkylene monomer (component "a"), an acrylic acid monomer (component "b"), a phosphate monoester (component "c"), and, optionally, a phosphate di-ester (component "d") and/or phosphate tri-ester (component "e"), wherein the foregoing described component monomers are present in carefully defined ratios.

The first component ("a") is a polyoxyalkylene monomer represented by structural formula (a)

wherein each of $R^1$ and $R^2$ individually represent a hydrogen atom or methyl group; $R^3$ represents hydrogen or —$(CH_2)_m(CO)_nO(AO)_pX^1$ group; AO represents an oxyalkylene group having 2 to 4 carbon atoms (preferably 2 carbon atoms); "m" represents an integer of 0 to 2; "n" represents an integer of 0 or 1; "p" represents an average number of the total oxyalkylene groups added and is an integer of from 5 to 200 (preferably from 5 to 100); and $X^1$ represents a hydrogen atom or alkyl group, respectively.

The second component ("b") is an acrylic acid monomer represented by structural formula (b)

wherein each of $R^4$, $R^{5'}$ and $R^6$ individually represent a hydrogen atom, a methyl group or —$(CH_2)_qC(O)OM^1$, respectively; "q" represents an integer from 0 to 2; and $M^1$ represents a hydrogen atom, an alkali metal, or an alkali earth metal, respectively.

The third component ("c") is a phosphate monoester monomer represented by structural formula (c)

wherein $R^7$ represents a hydrogen atom or a methyl group; $R^8$ represents an alkylene group having 2 to 4 carbon atoms (preferably 2 carbon atoms); "r" is an integer of from 1 to 30 (preferably from 1 to 5); $M^2$ represents a hydrogen atom, an alkali metal or an alkali earth metal, respectively.

The fourth component ("d") is a phosphate diester monomer represented by structural formula (d)

wherein each of $R^9$ and $R^{11}$ individually represent a hydrogen atom or methyl group; each of $R^{10}$ and $R^{12}$ individually represent an alkylene group having 2 to 4 carbon atoms; each of "s" and "t" individually represent an integer of from 1 to 30 (preferably from 1 to 5); and $M^3$ represents a hydrogen atom, an alkali metal or an alkali earth metal, respectively.

The fifth component ("e") is a phosphate triester monomer represented by structural formula (e)

wherein each of $R^{13}$, $R^{15}$, and $R^{17}$ individually represent a hydrogen atom or methyl group; $R^{14}$, $R^{16}$ and $R^{18}$ each individually represent an alkylene group having 2 to 4 carbon atoms (preferably 2 carbon atoms); and each of "w", "x" and "y" individually represent an integer of from 1 to 30 (preferably from 1 to 5), respectively.

The foregoing monomer components (a), (b), (c), (d), and (e) are present in the following molar ratios, whereby the numerator and denominator numbers in a given range add up to 100, as follows:

(i) the molar ratio of monomers (a)+(b) to monomers (c)+(d)+(e) is in the range of 94-98/2-6;
(ii) the molar ratio of monomer (a) to monomer (b) is in the range of 20-60/40-80;
(iii) the molar ratio of monomer (c) to monomers (d)+(e) is in the range of 50-100/0-50; and
(iv) the molar ratio of monomers (d) and (e) to all monomers (a) through (e) is in the range of 0-2/98-100.

In other words, each of the molar ratios provided in subsections (i) through (iv) above is based on respective percentages of the monomer components identified, such that the numerator and denominator for each molar ratio range will add up to 100.

Exemplary methods of the invention for making the above-discussed carboxylated phosphate ester containing polymers comprise the step of copolymerizing monomer components (a), (b), (c), (d), and (e) in the presence of a chain transfer agent. Exemplary chain transfer agents may include a thiol-based chain transfer agents as the most preferable. The chain transfer agent may be used in an amount of at least 3.5 mol percent based on the monomer components (a) through (e). In further exemplary methods, the monomers are copolymerized in the presence of a polymerization initiator in an amount of at least 2 mole percent based on total moles of all said monomers in said polymer composition. Exemplary initiators may include an ammonium salt or alkali metal salt of persulfuric acid or water-soluble azo compounds.

Preferred phosphate-containing polycarboxylate polymer dispersants of the present invention have a weight-average molecular of 15,000 to 100,000 [Da] and a weight-average molecular weight (Mw)/number-average molecular weight (Mn) ratio (Mw/Mn) from 1.0 to 2.8. The Mw and Mn are measured by gel permeation chromatography (hereinafter "GPC") under the following conditions. GPC columns are commercially available from Waters Corporation, Massachusetts, USA, under the trade names ULTRAHYDROGEL™ 1000 (WAT011535-T30141), ULTRAHYDROGEL™ 250 (WAT011525-T23571) and ULTRAHYDROGEL™ 120 (WAT011520-T23641). A number of other GPC columns are commercially available which are also believed to be suitable for present purposes. Exemplary GPC processing conditions include the following: elution solvent (1% potassium nitrate); flow rate (0.6 mL/min); run time (72 minutes); column temperature (35° C.); injection volume (80 μL); detector (refractive index); standard (polyethylene glycol).

However, it should be noted that the GPC average molecular weight typically exhibits some fluctuation depending on the GPC measurements conditions and the data analysis, e.g. calibration line determination and baseline determination. The fluctuation may be especially greater if the compound molecular weight is smaller, e.g. below 1,000 [Da].

While the phosphate-containing polycarboxylate polymer dispersants of the present invention are described herein and after using a limited number of embodiments, these specific embodiments are not intended to limit the scope of the invention as otherwise described and claimed herein. Modification and variations from the described embodiments exist. The following examples include prior art ("comparative") examples of phosphate-containing polycarboxylate polymers dispersants, as well as examples of polymer dispersants of the present invention, which is not limited to the specific details set forth in the examples.

All parts and percentages in the examples, as well as in the remainder of the specification, are by weight unless otherwise specified. Further, any range of numbers recited in the specification or claims, such as that representing a particular set of properties, units of measure, conditions, physical states or percentages, is intended to literally incorporate expressly herein by reference or otherwise, any number falling within such range, including any subset of numbers within any range so recited. For example, whenever a numerical range with a lower limit, RL, and an upper limit RU, is disclosed, any number R falling within the range is specifically disclosed. In particular, the following numbers R within the range are specifically disclosed: R=RL+k*(RU−RL), where k is a variable ranging from 1% to 100% with a 1% increment, e.g., k is 1%, 2%, 3%, 4%, 5% . . . 50%, 51%, 52%, . . . 95%, 96%, 97%, 98%, 99%, or 100%. Moreover, any numerical range represented by any two values of R, as calculated above, is also specifically disclosed.

For purposes of making prior art phosphate-containing polycarboxylate polymer dispersants as well as for making exemplary embodiments of the present invention, the monomer groups designated herein as "c", "d" and "e" may be obtained using commercially sourced products which contain such monoester "c", di-ester "d" and tri-ester "e" groups. In the various examples provided hereinafter, two commercially available products were used: 2-hydroxyethylmethacrylate acid phosphate made by Johoku Chemical Co., Ltd under the trade name "JPA-514" and Phosphoric acid 2-hydroxyethyl methacrylate ester sourced from Aldrich Chemicals.

The content of the monomers "c", "d" and "e" in the monomer mixture can be calculated according to $^{31}$P-NMR spectra conditions:

Composite-puls decoupling method (cpd)
Range of measurement 36496.352 Hz
Puls delay time 10.0 sec
Observed data points 32768
Puls width 9.60 μsec
Solvent THF or $CDCl_3$ Under these conditions, signals in an obtained chart are assigned to the following compounds, such that from their area ratio, a relative ratio can be calculated. For 2-hydroxyethylmethacrylate acid phosphate (commercially available under the trade name JPA-514 from Johoku Chemical Co., Ltd), the following was applicable: unreacted phosphoric acid=4.4 mol %; phosphoric mono-(2-hydroxyethyl)methacrylate=47.8 mol %; phosphoric di-(2-hydroxyethyl)methacrylate=28.9 mol %; phosphoric tri-(2-hydroxyethyl)methacrylate=5.7 mol %; and unknown impurities=3.2 mol %. For phosphoric acid 2-hydroxyethyl methacrylate ester (manufactured by Aldrich), the following was applicable: unreacted phosphoric acid=24.7 mol %; phosphoric mono-(2-hydroxyethyl)methacrylate=48.9 mol %; phosphoric di-(2-hydroxyethyl)methacrylate=18.7 mol %; phosphoric tri-(2-hydroxyethyl)methacrylate=1.4 mol %; pirophosphoric acid compounds=4.7 mol %; and unknown impurities=1.6 mol %.

Example 1

Prior Art

A glass flask (500 mL) was fitted with mantle heater and thermocouple connected to temperature controller and mechanical stirrer. Previously, a reactor was charged with 185 g of degassed and distilled water, the atmosphere in the reactor was substituted with argon, and the system was heated. A mixture of 41.30 g of poly(ethylene glycol)methyl ether methacrylate (number of ethylene oxide units added-23; manufactured by Aldrich), 0.33 g of methacrylic acid (product purity-99%; manufactured by Aldrich), 8.84 g of 2-hydroxyethylmethacrylate acid phosphate (manufactured by Johoku Chemical Co., Ltd) and 0.8 g of 3-mercaptopropionic acid, obtained by mixing and dissolving in 42 g of degassed and distilled water was prepared in advance (pH of monomers solution was adjusted 1.40). Separately, the solution of ammonium persulfate (4.07 g) in 34 g of degassed and distilled water was prepared. When the temperature reached 65° C. the monomers and initiator were added in drop-wise fashion for 1.5 hour (with constant speed). After the drop-wise addition was completed, the reaction mixture was kept another 2.5 hour at 65-68° C. All during this time, argon gas was bubbled through the reaction mixture with slow stirring of the solution. Finally, a copolymer solution with approximately 20 wt % solid content was obtained.

A glass flask (500 mL) was fitted with mantle heater and thermocouple connected to temperature controller and mechanical stirrer. Previously, a reactor was charged with 185 g of degassed and distilled water, the atmosphere in the reactor was substituted with argon, and the system was heated. A mixture of 42 g of poly(ethylene glycol)methyl ether methacrylate (number of ethylene oxide units added-23; manufactured by Aldrich), 2.10 g of methacrylic acid (product purity-99%; manufactured by Aldrich), 8.84 g of 2-hydroxyethylmethacrylate acid phosphate (manufactured by Johoku Chemical Co., Ltd) and 0.8 g of 3-mercaptopropionic acid, obtained by mixing and dissolving in 42 g of degassed and distilled water was prepared in advance (pH of monomers solution was adjusted to 1.40). Separately, the solution of ammonium persulfate (4.07 g) in 34 g of degassed and distilled water was prepared. When the temperature reached 65° C., the monomers and initiator were added drop-wise fashion for 1.5 hour (with constant speed). After the drop-wise addition was completed, the reaction mixture was kept another 2.5 hour at 65-68° C. All during this time, argon gas was bubbled through reaction mixture with slow stirring of the solution. Finally, a copolymer solution with approximately 20 wt % solid content was obtained.

The PRIOR ART polymers made in accordance with this example are designated in Table 1 below as Examples 1-1 and 1-2.

Example 2

Prior Art

A glass flask (500 mL) was fitted with mantle heater and thermocouple connected to temperature controller and mechanical stirrer. Previously, a reactor was charged with 185 g of degassed, distilled water, the atmosphere in the reactor was substituted with argon and the system was heated. A mixture of 42 g of poly(ethylene glycol)methyl ether methacrylate (number of ethylene oxide units added-23; manufactured by Aldrich), 8.84 g of 2-hydroxyethylmethacrylate acid phosphate (manufactured by Johoku Chemical Co., Ltd) and 0.8 g of 3-mercaptopropionic acid, obtained by mixing and dissolving in 41 g of degassed and distilled water, was prepared in advance (pH of monomers solution was adjusted to 1.40). Separately, the solution of ammonium persulfate (4.07 g) in 34 g of degassed, distilled water was prepared. When the temperature reached 60° C. the monomers and initiator were added in drop-wise fashion for 1.5 hour (with constant speed). After the drop-wise addition was finished, the reaction was kept for another 2.5 hour at 65-68° C. All during this time, argon gas was bubbled through reaction mixture with slow stirring of the solution. Finally, a copolymer solution with approximately 20 wt % solid content was obtained.

A glass flask (500 mL) was fitted with mantle heater and thermocouple connected to temperature controller and mechanical stirrer. Previously, a reactor was charged with 185 g of degassed and distilled water, the atmosphere in the reactor was substituted with argon and the system was heated. A mixture of 42 g of poly(ethylene glycol)methyl ether methacrylate (number of ethylene oxide units added-23; manufactured by Aldrich), 22.35 g of 2-hydroxy-ethylmethacrylate acid phosphate (manufactured by Johoku Chemical Co., Ltd) and 1.9 g of 3-mercaptopropionic acid, obtained by mixing and dissolving in 42 g of degassed and distilled water was prepared in advance (pH of monomers solution was adjusted to 1.4). Separately, the solution of ammonium persulfate (4.07 g) in 34 g of degassed, distilled water was prepared. When the temperature reached 60° C. the monomers and initiator were added in drop-wise fashion for 1.5 hour (with constant speed). After the drop-wise addition was completed, the reaction was kept for another 2.5 hour at 65-68° C. All during this time, argon gas was bubbled through reaction mixture with slow stirring of the solution. Finally, a copolymer solution with approximately 20 wt % solid content was obtained.

The PRIOR ART polymers made in accordance with this example are designated in Table 1 below as Examples "2-1" and "2-2."

Example 3

Prior Art

A glass flask (500 mL) was fitted with mantle heater and thermocouple connected to temperature controller and mechanical stirrer. Previously, a reactor was charged with 185 g of degassed and distilled water, the atmosphere in the reactor was substituted with argon, and the system was heated. A mixture of 42 g of poly(ethylene glycol)methyl ether methacrylate (number of ethylene oxide units added-23; manufactured by Aldrich), 0.33 g of methacrylic acid (product purity-99%; manufactured by Aldrich), 8.84 g of Phosphoric acid 2-hydroxyethyl methacrylate ester (manufactured by Aldrich) and 0.8 g of 3-mercaptopropionic acid obtained by mixing and dissolving in 42 g of degassed and distilled water (pH of monomers solution was adjusted to 1.40). Separately, the solution of ammonium persulfate (4.07 g) in 34 g of degassed and distilled water was prepared. When the temperature reached 60° C. the monomers and initiator were added in drop-wise fashion for 1.5 hour (with constant speed). After the drop-wise addition was completed, the reaction was kept for another 2.5 hour at 65-68° C. All during this time, argon gas was bubbled through reaction mixture with slow stirring of the solution. Finally, a copolymer solution with approximately 20 wt % solid content was obtained.

A glass flask (500 mL) was fitted with mantle heater and thermocouple connected to temperature controller and mechanical stirrer. Previously, a reactor was charged with 185 g of degassed and distilled water, the atmosphere in the reactor was substituted with argon, and the system was heated. A mixture of 42 g of poly(ethylene glycol)methyl ether methacrylate (number of ethylene oxide units added-23; manufactured by Aldrich), 2.10 g of methacrylic acid (product purity-99%; manufactured by Aldrich), 8.84 g of Phosphoric acid 2-hydroxyethyl methacrylate ester (manufactured by Aldrich) and 0.8 g of 3-mercaptopropionic acid obtained by mixing and dissolving in 42 g of degassed and distilled water (pH of monomers solution was adjusted to 1.40). Separately, the solution of ammonium persulfate (4.07 g) in 34 g of degassed and distilled water was prepared. When the temperature reached 60° C. the monomers and initiator were added in drop-wise fashion for 1.5 hour (with constant speed). After the drop-wise addition was completed, the reaction was kept for another 2.5 hour at 65-68° C. All during this time, argon gas was bubbled through reaction mixture with slow stirring of the solution. Finally, a copolymer solution with approximately 20 wt % solid content was obtained.

The PRIOR ART polymers made in accordance with this example are designated in Table 1 below as Examples "3-1" and "3-2."

Example 4

Prior Art

A glass flask (500 mL) was fitted with mantle heater and thermocouple connected to temperature controller and mechanical stirrer. Previously, a reactor was charged with 185 g of degassed and distilled water, the atmosphere in the reactor was substituted with argon and the system was heated. A mixture of 42 g of poly(ethylene glycol)methyl ether methacrylate (number of ethylene oxide units added-23; manufactured by Aldrich), 8.84 g of phosphoric acid 2-hydroxyethyl methacrylate ester (manufactured by Aldrich) and 0.8 g of 3-mercaptopropinic acid, obtained by mixing and dissolving in 42 g of degassed and distilled water, was prepared in advance (pH of monomers solution was adjusted to was 1.40). Separately, the solution of ammonium persulfate (4.07 g) in 34 g of degassed and distilled water was prepared. When the temperature reached 60° C. the monomers and initiator were added in drop-wise fashion for 1.5 hour (with constant speed). After the drop-wise addition was completed, the reaction mixture was kept another 2.5 hour at 65-68° C. All during this time, argon gas was bubbled through reaction mixture with slow stirring of the solution. Finally, a copolymer solution with approximately 20 wt % solid content was obtained.

After the drop-wise addition was completed, the reaction mixture was kept another 2.5 hour at 65-68° C. All during this time, argon gas was bubbled through reaction mixture with slow stirring of the solution. Finally, a copolymer solution with approximately 20 wt % solid content was obtained.

The PRIOR ART polymers made in accordance with this example are designated in Table 1 below as Examples "4-1" and "4-2."

Based on Gel Permeation Chromatography (GPC) analysis, the Mw (weight average molecular weight) as well as Mn (number average molecular weight) were determined. Moreover, based on $^1$H as well as $^{31}$P-NMR spectra analysis, the molar composition was also determined for each of described PRIOR ART Examples 1-4.

With respect to $^1$H NMR measurements, the following conditions applied:
  Composite-puls decoupling method (cpd)
  Range of measurement 4139.073 Hz
  Puls delay time 1.0 sec
  Observed data points 16384
  Puls width 9.70 μsec
  Solvent CDCl$_3$ With respect to $^{31}$P-NMR measurements, the following conditions applied:
  Composite-puls decoupling method (cpd)
  Range of measurement 36496.352 Hz
  Puls delay time 10.0 sec and 2.0 sec.
  Observed data points 32768
  Puls width 9.60 μsec
  Solvent D$_2$O The polymers of comparative examples 1-4 are summarized in Table 1 below.

TABLE 1

| PRIOR ART Ex. No. | Mw [Da] | Mw/Mn | Molar composition [mol %] based on the total mole number* of the following monomers | | | | Total amount of a + c + d + e based on total mole number [mol %] | Molar ratio of (a + b)/ (c + d + e) provided that total = 100% | Molar ratio of a/ (c + d + e) provided that total = 100% | Molar ratio of a/c/(d + e) provided that total = 100% |
|---|---|---|---|---|---|---|---|---|---|---|
| | | | a | b | c | d + e | | | | |
| 1-1 | 35491 | 2.36 | 45.6 | 32.6 | 10.3 | 10.3 | 66.6 | 79/21 | 69/31 | 69.0/15.5/15.5 |
| 1-2 | 22208 | 1.78 | 50.0 | 34.4 | 7.3 | 7.9 | 65.3 | 85/15 | 77/23 | 76.6/11.2/12.2 |
| 2-1 | 19995 | 1.67 | 76.2 | — | 11.0 | 11.8 | 99.0 | 77/23 | 77/23 | 76.8/11.1/11.9 |
| 2-2 | 26796 | 2.34 | 58.3 | — | 19.9 | 20.6 | 98.9 | 59/41 | 59/41 | 59.0/20.2/20.9 |
| 3-1 | 18912 | 1.61 | 41.8 | 36.3 | 11.7 | 2.9 | 56.4 | 84/16 | 74/26 | 74.0/20.8/5.1 |
| 3-2 | 24824 | 1.76 | 50.0 | 14.3 | 17.7 | 4.8 | 72.5 | 74/26 | 69/31 | 69.0/24.4/6.6 |
| 4-1 | 16770 | 1.54 | 69.2 | — | 16.6 | 4.2 | 90.0 | 77/23 | 77/23 | 76.9/18.5/4.6 |
| 4-2 | 17158 | 1.61 | 45.4 | — | 27.6 | 7.0 | 79.9 | 57/43 | 57/43 | 56.7/34.5/8.8 |

*The rest of the molar composition (to 100%) mainly consists of unreacted phosphoric acid (which originally becomes from starting material—phosphoric acid 2-hydroxyethyl methacrylate ester)

A glass flask (500 mL) was fitted with mantle heater and thermocouple connected to temperature controller and mechanical stirrer. Previously, a reactor was charged with 185 g of degassed and distilled water, the atmosphere in the reactor was substituted with argon and the system was heated. A mixture of 42 g of poly(ethylene glycol)methyl ether methacrylate (number of ethylene oxide units added-23; manufactured by Aldrich), 22.35 g of phosphoric acid 2-hydroxyethyl methacrylate ester (manufactured by Aldrich) and 1.9 g of 3-mercaptopropinic acid, obtained by mixing and dissolving in 42 g of degassed and distilled water, was prepared in advance (pH of monomers solution was adjusted to 1.4). Separately, the solution of ammonium persulfate (4.07 g) in 34 g of degassed and distilled water was prepared. When the temperature reached 60° C. the monomers and initiator were added in drop-wise fashion for 1.5 hour (with constant speed).

Example 5

Exemplary Polymers of Present Invention Designated as "5-1" and "5-2"

A glass flask (500 mL) was fitted with mantle heater and thermocouple connected to temperature controller and mechanical stirrer. Previously, a reactor was charged with 134 g of degassed, distilled water, the atmosphere in the reactor was substituted with argon and the system was heated. A mixture of 44 g of poly(ethylene glycol)methyl ether methacrylate (number of ethylene oxide units added-23; manufactured by Aldrich), 6.9 g of methacrylic acid (product purity-99%; manufactured by Aldrich), 2.6 g of 2-hydroxyethyl-methacrylate acid phosphate (manufactured by Johoku Chemical Co., Ltd) and 0.7 g of 3-mercaptopropionic acid, obtained by mixing and dissolving in 60 g of degassed and distilled water, was prepared in advance. Separately, the solution of ammonium or potassium persulfate (1 g) in 20 g of degassed, distilled water was prepared. When the temperature reached 60° C. the monomers and initiator were added in drop-wise fashion for 1 and 1.5 hour, respectively (with constant speed). After the drop-wise addition was finished, the reaction was kept for another 1 hour at 65-68° C. All during this time, argon gas was bubbled through reaction mixture with slow stirring of the solution. Finally, a copolymer solution with approximately 20 wt % solid content was obtained.

A glass flask (500 mL) was fitted with mantle heater and thermocouple connected to temperature controller and mechanical stirrer. Previously, a reactor was charged with 134 g of degassed distilled water, the atmosphere in the reactor was substituted with argon and the system was heated. A mixture of 44 g of poly(ethylene glycol)methyl ether methacrylate (number of ethylene oxide units added-23; manufactured by Aldrich), 6.9 g of methacrylic acid (product purity-99%; manufactured by Aldrich), 2.6 g of phosphoric acid 2-hydroxyethyl methacrylate ester (manufactured by Aldrich) and 0.7 g of 3-mercaptopropionic acid, obtained by mixing and dissolving in 60 g of degassed and distilled water, was prepared in advance. Separately, the solution of ammonium or potassium persulfate (1 g) in 20 g of degassed, distilled water was prepared. When the temperature reached 60° C. the monomers and initiator were added in drop-wise fashion for 1 and 1.5 hour, respectively (with constant speed). After the drop-wise addition was completed, the reaction mixture was kept for another 1 hour at 65-68° C. All during this time, argon gas was bubbled through reaction mixture with slow stirring of the solution. Finally, a copolymer solution with approximately 20 wt % solid content was obtained.

To produce exemplary copolymers of the invention, other synthetic methods may be used. For example, a mixture of the macromonomer (poly)ethylene glycol)methyl ether methacrylate) and 3-mercaptopropionic acid, obtained by mixing and dissolving in degassed, distilled water can be prepared in advance. At the same time, the solutions of methacrylic acid in water (degassed, distilled) as well as 2-hydroxyethylmethacrylate acid phosphate can be prepared. When the temperature reaches 60° C. initiator, each of monomers solutions can be add drop-wise (separately) for 1-1.5 hours, according to the same general synthetic procedure as described above. The solution of two acidic components (as methacrylic acid and 2-hydroxyethylmethacrylate acid phosphate) in degassed, distilled water can be prepared in advance and added during the reaction time, according to the same procedure as described above. Also, a method may be adopted in which a reactor is charged with monomers water solution, to which only the initiator is added in drop-wise fashion, according to the same general procedure described above. Specifically, the chain transfer agent may be added either as an additive solution separately from the monomers solution or by compounding in the monomer(s) solution.

The polymers are deemed to be illustrative of the present invention and designated in Table 2 below as Examples "5-1" and "5-2." Based on GPC analysis, weight average molecular weight (Mw) and number average molecular weight (Mn) were determined. Based on $^1H$ and $^{31}P$-NMR spectra analysis, molar composition was also determined for each of the examples (Table 2).

With respect to $^1H$ NMR measurements, the following conditions applied:
Composite-puls decoupling method (cpd)
Range of measurement 4139.073 Hz
Puls delay time 1.0 sec
Observed data points 16384
Puls width 9.70 μsec
Solvent $CDCl_3$ With respect to $^{31}P$-NMR measurements, the following conditions applied:
Composite-puls decoupling method (cpd)
Range of measurement 36496.352 Hz
Puls delay time 10.0 sec and 2.0 sec.
Observed data points 32768
Puls width 9.60 μsec
Solvent $D_2O$

TABLE 2

| Sample | Mw [Da] | Mw/Mn | Molar composition [mol %] based on the total mole number* of the following monomers | | | | Total amount of a + c + d + e based on total mole number [mol %] | Molar ratio of (a + b)/ (c + d + e) provided that total = 100% | Molar ratio of a/ (c + d + e) provided that total = 100% | Molar ratio of a/c/(d + e) provided that total = 100% |
|---|---|---|---|---|---|---|---|---|---|---|
| | | | a | B | c | d + e | | | | |
| 5-1 | 28557 | 2.16 | 52.6 | 44.7 | 1.3 | 1.2 | 55.2 | 97.4/2.6 | 95.3/4.7 | 95.3/2.4/2.3 |
| 5-2 | 23349 | 1.85 | 48.9 | 46.7 | 2.7 | 0 | 51.6 | 97.3/2.7 | 94.7/5.2 | 94.8/5.2/0 |

*The rest of the molar composition (to 100%) mainly consists of unreacted phosphoric acid (which originally becomes from starting material—phosphoric acid 2-hydroxyethyl methacrylate ester)

The foregoing example polymers, including comparative examples based on PRIOR ART polymers of Examples 1-4 and the exemplary polymers of Example 5, were tested in a concrete formulation that is summarized in Table 3 below.

TABLE 3

| | Unit quantity (kg/m³) | | | |
|---|---|---|---|---|
| Water/Cement (%) | Water (deionized) | Cement | Small Aggregate | Coarse Aggregate |
| 42 | 158 | 375 | 652 | 1110 |

As noted in Table 3, the materials used were deionized water, Normal Portland Cement CEM I 42.5R manufactured by Holcim Laegerdorf, small aggregate having 0-1 mm diameter manufactured by Dörentrup, Germany (88 kg) and having 0-2 mm, manufactured by Niemegk, Germany (564 kg); and coarse aggregate having 2-8 mm diameter, manufactured by Niemegk, Germany (264 kg) and 8-16 mm manufactured by Niemegk, Germany (846 kg).

The concrete was prepared as follows. 20 L concrete was prepared by mixing the sand and gravel with half of mixing water for 30 seconds in a ZYKLOS™ rotating pan mixer (ZZ50HE). After introduction of cement, mixing was continued for 15 seconds, and remainder of water with admixture was added and mixed for 90 seconds. After 60 seconds at rest, mixing continued for 90 seconds at 21° C. The copolymers were tested at three different dosages as shown in Table 4-6. The slump of concrete was determined in accordance with standard method (EN 12350-2) using a cone having a top opening diameter of 100 mm, a bottom opening diameter of 200 mm and a height of 300 mm (concrete was divided into 3 layers and each of the layers was stuffed and poked evenly 25 times with a pocking rod). The slump was determined after 10 and 30 minutes, as presented in Tables 4-6 below. Amount of air in concrete was kept below 2.8% by using a defoamer.

The method of testing the slump of concrete was done according to EN 12350-2 and the method of testing the compressive strength of concrete was done according to EN 12390-3 (based on use of 10 cm cubes). The test results are provided below. The tests were performed on concrete samples containing 0.08%, 0.10%, and 0.12% of the polymer admixture based on weight of the cement.

TABLE 4

(Testing in Concrete based on dosage of 0.08% based on wt. cement)

| Sample | Molar Ratio of monomers (a + b)/(c + d + e) | Molar Ratio of monomers a/(c + d + e) | Slump (mm) 10 min | Slump (mm) 30 min | Compressive Strength (MPa) 1 day | Compressive Strength (MPa) 7 days | Compressive Strength (MPa) 28 days |
|---|---|---|---|---|---|---|---|
| 1-1 | 79/21 | 69/31 | 65 | 47 | 25.6 | 55.0 | 66.8 |
| 1-2 | 85/15 | 77/23 | 85 | 57 | 27.6 | 59.7 | 68.9 |
| 2-1 | 77/23 | 77/23 | 62 | 49 | 29.1 | 47.7 | 58.5 |
| 2-2 | 59/41 | 59/41 | 52 | n.a. | 27.7 | 54.9 | 65.5 |
| 3-1 | 84/16 | 74/26 | 130 | 80 | 24.0 | 56.6 | 67.3 |
| 3-2 | 74/26 | 69/31 | 115 | 70 | 24.4 | 54.9 | 64.3 |
| 4-1 | 77/23 | 77/23 | 96 | 74 | 24.9 | 56.3 | 67.6 |
| 4-2 | 57/23 | 57/43 | 108 | 67 | 23.2 | 55.5 | 66.0 |
| 5-1 | 97.4/2.6 | 95.3/4.7 | 178 | 121 | 24.0 | 57.0 | 69.2 |
| 5-2 | 97.3/2.7 | 94.7/5.2 | 168 | 99 | 24.7 | 56.8 | 67.9 |

TABLE 5

(Testing in Concrete based on dosage of 0.10% based on wt. cement)

| Sample | Molar Ratio of monomers (a + b)/(c + d + e) | Molar Ratio of monomers a/(c + d + e) | Slump (mm) 10 min | Slump (mm) 30 min | Compressive Strength (MPa) 1 day | Compressive Strength (MPa) 7 days | Compressive Strength (MPa) 28 days |
|---|---|---|---|---|---|---|---|
| 1-1 | 79/21 | 69/31 | 73 | 56 | 26.0 | 55.0 | 65.0 |
| 1-2 | 85/15 | 77/23 | 147 | 93 | 28.5 | 57.4 | 63.9 |
| 2-1 | 77/23 | 77/23 | 74 | 54 | 29.4 | 48.4 | 59.8 |
| 2-2 | 59/41 | 59/41 | 74 | 55 | 27.3 | 57.0 | 66.6 |
| 3-1 | 84/16 | 74/26 | 185 | 130 | 25.2 | 55.8 | 65.3 |
| 3-2 | 74/26 | 69/31 | 159 | 94 | 25.2 | 56.0 | 65.4 |
| 4-1 | 77/23 | 77/23 | 122 | 82 | 25.4 | 56.6 | 67.8 |
| 4-2 | 57/23 | 57/43 | 76 | 51 | 22.0 | 54.6 | 62.2 |
| 5-1 | 97.4/2.6 | 95.3/4.7 | 227 | 175 | 23.6 | 57.7 | 68.3 |
| 5-2 | 97.3/2.7 | 94.7/5.2 | 232 | 175 | 24.0 | 58.7 | 71.4 |

TABLE 6

(Testing in Concrete based on dosage of 0.12% based on wt. cement)

| Sample | Molar Ratio of monomers (a + b)/(c + d + e) | Molar Ratio of monomers a/(c + d + e) | Slump (mm) 10 min | Slump (mm) 30 min | Compressive Strength (MPa) 1 day | Compressive Strength (MPa) 7 days | Compressive Strength (MPa) 28 days |
|---|---|---|---|---|---|---|---|
| 1-1 | 79/21 | 69/31 | 89 | 62 | 26.2 | 53.4 | 64.2 |
| 1-2 | 85/15 | 77/23 | 170 | 101 | 27.6 | 56.9 | 67.0 |
| 2-1 | 77/23 | 77/23 | 85 | 54 | 29.3 | 51.0 | 58.0 |
| 2-2 | 59/41 | 59/41 | 95 | 59 | 25.7 | 56.7 | 65.0 |
| 3-1 | 84/16 | 74/26 | 220 | 185 | 24.1 | 57.0 | 69.3 |
| 3-2 | 74/26 | 69/31 | 209 | 141 | 25.2 | 58.5 | 68.0 |
| 4-1 | 77/23 | 77/23 | 205 | 190 | 23.3 | 57.5 | 70.0 |
| 4-2 | 57/23 | 57/43 | 136 | 76 | 22.3 | 55.1 | 65.4 |
| 5-1 | 97.4/2.6 | 95.3/4.7 | 231 | 200 | 31.6 | 52.3 | 61.9 |
| 5-2 | 97.3/2.7 | 94.7/5.2 | 250 | 219 | 25.6 | 60.0 | 72.3 |

The PRIOR ART polymers of Examples 1-1 and 1-2 and the exemplary polymer of Example 5-1 were tested in a mortar formulation that is summarized in Table 7 below.

TABLE 7

| | Unit quantity (kg/m$^3$) | | | |
|---|---|---|---|---|
| Water/Cement (%) | Water (deionized) | Cement | Small Aggregate | Coarse Aggregate |
| 40 | 504 | 1264 | 2700 | 0 |

As noted in Table 7, the materials used were Deionized water, cement: ASTM C 150 (manufactured by Holcim), and sand (EN 196-1).

The mortar was prepared as follows. All presented ingredients were added to the mixer and fully mixed. With the mixer rotating at low speed, a dose of polymer was added to the mortar and power measurements were recorded over time until the power measurement stabilized. The mixing temperature was approximately 21° C. Workability was measured manually by the mini-slump test before and after admixture addition. The mini-slump test consisted of a mold in the shape of a frustum of a cone with a top diameter of 50 mm, a bottom diameter of 100 mm, and height of 150 mm. The mini-slump mold was filled with mortar, and then removed. Workability was calculated using the following measurements: slump+spread−100. The slump was the distance the mortar subsided from its original height, while spread was the horizontal diameter of the mortar after flow stopped. A defoamer was added to each polymer before addition to mortar.

Table 8 summarizes the results of the testing. The time to 90% mixed was determined as the time to reach 90% of the change in mixer power from prior to admixture addition to the final stabilized power.

The mortar was evaluated as follows. The power drawn by a laboratory mortar mixer was measured in order to assess the mixing time by each polymer. A standard laboratory mortar mixing meeting the requirements of ASTM C 305 was connected to a power meter. The change in power to operate the mixer with a given volume of mortar was considered to be indicative of the change in the workability of a mortar.

TABLE 8

Mortar test results

| Polymer Sample | The molar ratio of monomers (a + b)/(c + d + e) provided that the total 100% | The molar ratio of monomers: a/(c + d + e) provided that the total is 100% | Polymer Dose [% s/c] | Workability before polymer addition | Workability after polymer addition | Time to 90% mixed |
|---|---|---|---|---|---|---|
| 1-1 (PRIOR ART) | 79/21 | 69/31 | 0.17 | 37 | 166 | 14 |
| 1-2 (PRIOR ART) | 85/15 | 77/23 | 0.15 | 45 | 221 | 42 |
| 5-1 | 97.4/2.6 | 95.3/4.7 | 0.11 | 39 | 252 | 54 |

As shown above in Table 8, the phosphate-containing polycarboxylate polymer dispersant of the present invention (polymer sample 5-1), which had a molar ratio of monomers (a+b/c+d+e) of 97.4/2.6, demonstrated an increase in workability that far exceeded the workability enabled by the PRIOR ART polymer samples 1-1 and 1-2. Based on presented data it can be concluded that the phosphorylate monomer content in the polymer structure strongly affected both dispersing efficiency as well as adsorption ability. It is evident that as the phosphorylate monomer content increases, the dose of dispersant has to be increased to achieve an adequate change in workability. After the dispersant, the power decreases then eventually stabilized. The time for this stabilization to occur was ordered as follows: Example 5-1>Comparative Example 1-2>Comparative Example 1-1.

In summary, the dispersant with the highest phosphorylate content resulted in the fastest mixing but required the highest dose for a given change in workability.

Figure 1:
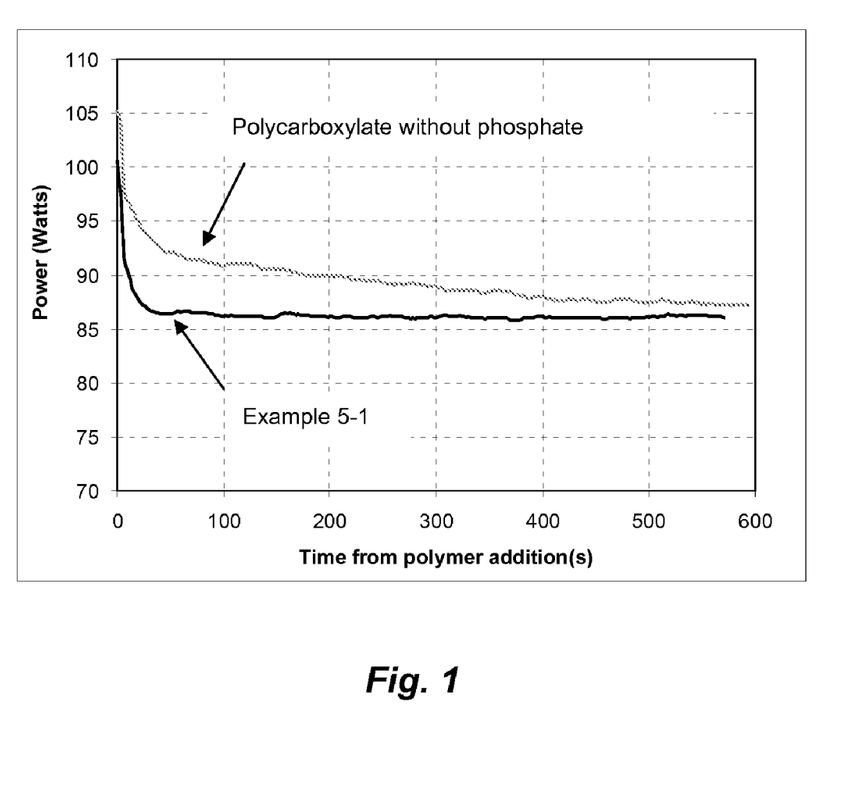
FIG. 1 is a graphic illustration of the slump behavior of a PRIOR ART polycarboxylate polymer that does not having any phosphate groups in comparison with the slump behavior of an exemplary phosphate-containing polymer of the present invention (Example 5-1).

Moreover, Example 5-1 was also tested against a commercially available polycarboxylate polymer not having phosphate groups. For this additional test, the same procedure was used (as described above). The obtained data is illustrated by the graphic illustration of FIG. 1. FIG. 1 suggests that the power drawn after the addition of example 5-1 polymer (at the dosage 0.135% by weight of cement or "bwoc") and a reference polymer (0.18% bwoc). For the reference polymer, the power decreased gradually over more than 500 seconds before stabilizing. This suggested that more than 500 seconds is required for this polymer to be fully mixed and impact cement dispersing. In contrast, the addition of polymer 5-1 resulted in a rapid reduction in power, stabilizing after less than 100 seconds.

Therefore, it can be concluded that exemplary polymer 5-1 of the present invention mixes and affects cement dispersion faster than the reference sample polymer, which is was a polycarboxylate polymer having methacrylic groups but containing no phosphate groups.

Based on presented data, the present inventors concluded that the polymer with following molar ratio: monomers (a)+(b) to monomers (c)+(d)+(e) in the range of 94-98/2-6 provided an enhanced cement absorption ability (i.e., faster mixing time) in comparison to conventional polycarboxylate polymer dispersant. Moreover this molar ratio (relatively low content of phosphorylate monomer in comparison to all comparative samples) provides also a good performance in terms of dispersing efficiency (presented as concrete slump and mortar workability) as well as compressive strength.

The principles, preferred embodiments, and modes of operation of the present invention have been described in the foregoing specification. The invention which is intended to be protected herein, however, is not to be construed as limited to the particular forms disclosed, since these are to be regarded as illustrative rather than restrictive. Skilled artisans can make variations and changes without departing from the spirit of the invention.

It is claimed:

1. A polymer dispersant composition, comprising: a polymer made from the following monomer groups:

(a) polyoxyalkylene monomer represented by structural formula wherein each of $R^1$ and $R^2$ individually represent a hydrogen atom or methyl group; $R^3$ represents hydrogen or $-(CH_2)_m(CO)_nO(AO)_pX^1$ group; AO represents an oxyalkylene group having 2 to 4 carbon atoms; "m" represents an integer of 0 to 2; "n" represents an integer of 0 or 1; "p" represents an average number of the total oxyalkylene groups added and is an integer of from 5 to 200; and $X^1$ represents a hydrogen atom or alkyl group, respectively;

(b) acrylic acid monomer represented by structural formula wherein each of $R^4$, $R^{5'}$ and $R^6$ individually represent a hydrogen atom, a methyl group or $-(CH_2)_qC(O)OM^1$, respectively; "q" represents an integer from 0 to 2; $M^1$ represents a hydrogen atom, an alkali metal, or an alkali earth metal, respectively;

(c) phosphate monoester monomer represented by structural formula wherein $R^7$ represents a hydrogen atom or a methyl group; $R^8$ represents an alkylene group having 2 to 4 carbon atoms; "r" is an integer of from 1 to 30; $M^2$ represents a hydrogen atom, an alkali metal or an alkali earth metal, respectively; and (d) phosphate diester monomer represented by structural formula wherein each of $R^9$ and $R^{11}$ individually represent a hydrogen atom or methyl group; each of $R^{10}$ and $R^{12}$ individually represent an alkylene group having 2 to 4 carbon atoms; each of "s" and "t" individually represent an integer of from 1 to 30; $M^3$ represents a hydrogen atom, an alkali metal or an alkali earth metal, respectively; and (e) phosphate triester monomer represented by structural formula (e)

wherein each of $R^{13}$, $R^{15}$, and $R^{17}$ individually represent a hydrogen atom or methyl group; $R^{14}$, $R^{16}$ and $R^{18}$ each individually represent an alkylene group having 2 to 4 carbon atoms; each of "w", "x" and "y" individually represent an integer of from 1 to 30, respectively; and wherein the foregoing monomers (a), (b), (c), (d), and (e) are present in the following molar ratios, whereby the numerator and denominator numbers in a given range add up to 100, as follows:
(i) the molar ratio of monomers (a)+(b) to monomers (c)+(d)+(e) is in the range of 94-98/2-6;
(ii) the molar ratio of monomer (a) to monomer (b) is in the range of 20-60/40-80;
(iii) the molar ratio of monomer (c) to monomers (d)+(e) is in the range of 50-100/0-50; and
(iv) the molar ratio of monomers (d) and (e) to all monomers (a) through (e) is in the range of 0-2/98-100.

2. The polymer dispersant composition of claim 1 wherein, in monomer component (a), said AO represents an oxyalkylene group having 2 carbon atoms, and said "p" is an integer of from 5 to 100.

3. The polymer dispersant composition of claim 1 wherein, in monomer component (c), said $R^8$ represents an alkylene group having 2 carbon atoms and said "r" is an integer of 1 to 5.

4. The polymer dispersant composition of claim 1 wherein, in monomer component (d), said $R^{10}$ and $R^{12}$ each individually represent an alkylene group having 2 carbon atoms and said "s" and "t" each individually represent an integer of 1 to 5.

5. The polymer dispersant composition of claim 1 wherein, in monomer component (e), each of said $R^{14}$, $R^{16}$, and $R^{18}$ individually represent an alkylene group having 2 carbon atoms and each of said "w", "x" and "y" individually represent an integer of from 1 to 5.

6. A method for modifying a cementitious composition comprising adding to a hydratable cementitious binder the polymer dispersant composition of claim 1.

7. The method of claim 6 wherein said monomers are copolymerized in the presence of a chain transfer agent.

8. The method of claim 7 wherein said chain transfer agent is used in an amount of at least 3.5 mol percent based on said monomers.

9. The method of claim 8 wherein said monomers are copolymerized in the presence of a polymerization initiator in an amount of at least 2 mole percent based on total moles of all said monomers in said polymer dispersant composition.

10. A cement composition comprising a hydratable cementitious binder and the polymer dispersant composition of claim 1.

11. A polymer dispersant composition, comprising: a polymer made from the following monomer groups:
(a) polyoxyalkylene monomer represented by structural formula (a)

wherein each of $R^1$ and $R^2$ individually represent a hydrogen atom or methyl group; $R^3$ represents hydrogen or —$(CH_2)_m(CO)_nO(AO)_pX^1$ group; AO represents an oxyalkylene group having 2 carbon atoms; "m" represents an integer of 0 to 2; "n" represents an integer of 0 or 1; "p" represents an average number of the total oxyalkylene groups added and is an integer of from 5 to 100; and $X^1$ represents a hydrogen atom or alkyl group, respectively;

(b) acrylic acid monomer represented by structural formula (b)

wherein each of $R^4$, $R^{5'}$ and $R^6$ individually represent a hydrogen atom, a methyl group or —$(CH_2)_qC(O)OM^1$, respectively; "q" represents an integer from 0 to 2; $M^1$ represents a hydrogen atom, an alkali metal, or an alkali earth metal, respectively;

(c) phosphate monoester monomer represented by structural formula (c)

wherein $R^7$ represents a hydrogen atom or a methyl group; $R^8$ represents an alkylene group having 2 carbon atoms; "r" is an integer of from 1 to 5; $M^2$ represents a hydrogen atom, an alkali metal or an alkali earth metal, respectively; and

(d) phosphate diester monomer represented by structural formula (d)

wherein each of $R^9$ and $R^{11}$ individually represent a hydrogen atom or methyl group; each of $R^{10}$ and $R^{12}$ individually represent an alkylene group having 2 carbon atoms; each of "s" and "t" individually represent an integer of from 1 to 5; $M^3$ represents a hydrogen atom, an alkali metal or an alkali earth metal, respectively; and (e) phosphate triester monomer represented by structural formula (e)

wherein each of $R^{13}$, $R^{15}$, and $R^{17}$ individually represent a hydrogen atom or methyl group; $R^{14}$, $R^{16}$ and $R^{18}$ each individually represent an alkylene group having 2 carbon atoms; each of "w", "x" and "y" individually represent an integer of from 1 to 5, respectively; and wherein the foregoing monomers (a), (b), (c), (d), and (e) are present in the following molar ratios, whereby the numerator and denominator numbers in a given range add up to 100, as follows:
(i) the molar ratio of monomers (a)+(b) to monomers (c)+(d)+(e) is in the range of 94-98/2-6;
(ii) the molar ratio of monomer (a) to monomer (b) is in the range of 20-60/40-80;
(iii) the molar ratio of monomer (c) to monomers (d)+(e) is in the range of 50-100/0-50; and
(iv) the molar ratio of monomers (d) and (e) to all monomers (a) through (e) is in the range of 0-2/98-100.

* * * * *